United States Patent
Kim

(10) Patent No.: US 8,095,266 B2
(45) Date of Patent: Jan. 10, 2012

(54) LANE KEEPING ASSIST SYSTEM

(75) Inventor: Hoi Won Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 495 days.

(21) Appl. No.: 12/276,615

(22) Filed: Nov. 24, 2008

(65) Prior Publication Data
US 2009/0153360 A1 Jun. 18, 2009

(30) Foreign Application Priority Data
Dec. 12, 2007 (KR) .................. 10-2007-0129246

(51) Int. Cl.
*G06G 1/09* (2006.01)
(52) U.S. Cl. ........... 701/36; 701/300; 701/117; 340/937
(58) Field of Classification Search .......... 701/36, 701/41, 42, 96, 117–119, 300–302; 340/905, 340/907, 933–943; 342/27, 28, 69, 89, 90, 342/91, 98–101, 109–117, 128
See application file for complete search history.

(56) References Cited

U.S. PATENT DOCUMENTS 7,899,621 B2 * 3/2011 Breed et al. ............... 701/301
7,912,628 B2 * 3/2011 Chapman et al. ............ 701/117

FOREIGN PATENT DOCUMENTS

| JP | 10-308000 A | 11/1998 |
| JP | 2003-259361 | 9/2003 |
| JP | 2007-088541 | 4/2007 |
| KR | 10-0765891 B1 | 10/2007 |

* cited by examiner

*Primary Examiner* — Richard M. Camby
(74) *Attorney, Agent, or Firm* — Edwards Wildman Palmer LLP; Peter F. Corless

(57) ABSTRACT

A lane keeping assist system (LKAS) is equipped with a compensator capable of solving the problem in which video data, which is measured by a video sensor, the processing speed of which is lower than the data processing speed of the LKAS, is repeatedly used, thereby improving the kinematic characteristics of a vehicle and lane-keeping control performance.

6 Claims, 6 Drawing Sheets

LANE KEEPING ASSIST SYSTEM

CROSS-REFERENCE TO RELATED APPLICATIONS

This application claims under 35 U.S.C. §119(a) priority to Korean Application No. 10-2007-0129246, filed on Dec. 12, 2007, the disclosure of which is incorporated herein by reference in its entirety.

BACKGROUND

1. Technical Field

The present invention relates to a lane keeping assist system (LKAS).

2. Related Art

With the improvement of various functions of vehicles, various technologies for improving the safety and comfort of the drivers and passengers have been introduced. In particular, an LKAS capable of keeping a vehicle in a particular lane is close to commercialization.

An LKAS is a system for detecting whether a vehicle deviates from a target lane and assisting a driver in remaining in the target lane at a desired speed. In order to implement this, the target lane and the kinematic characteristics of the vehicle must be measured in real time, and appropriate control must be performed based on the results of the measurement.

In a prior art LKAS, the video data processing speed of a video sensor is lower than the data processing speed of the LKAS. Because of this, the prior art LKAS does not perform the function in a reliable manner.

For example, when the data processing period of the system is 10 ms and the video data frame measurement period of the video sensor is 50 ms, the system receives new video data from the video sensor every 50 ms in the processing of data, and thus the system repeatedly uses previous video data for 40 ms (four periods). As a result, the system has a problem in that the system cannot appropriately control the traveling of a vehicle because the same video data is used for five instances of data processing.

Of course, in the case of a high-performance video sensor, the data processing speed thereof can be synchronized with the data processing speed of a system, and thus the lane keeping function may be improved. However, since the high-performance video sensor is expensive, the use of the high-performance sensor increases manufacturing costs.

FIG. 1 is a diagram showing variables indicative of the kinematic characteristics of a vehicle. Referring to FIG. 1, the control variables of a lane keeping assist system that must be taken into account when a vehicle travels along a curved lane will be described below.

An LKAS enables a vehicle to remain in a lane the vehicle is traveling by measuring or estimating a velocity V of the vehicle, a lateral velocity v, a yaw rate $\gamma$, a required forward angle $\delta_f$ and a slide slip angle $\beta$, a deviation angle $\theta_p$ at a measuring point, and a deviation distance $y_p$ at the measuring point, outputting a steering motor torque based on the results of the measurement or estimation, and transmitting a drive signal related to the torque to the steering motor.

FIG. 2 is a graph illustrating the lane following performance of the prior art LKAS, and FIG. 3 is a graph illustrating the lane following performance based on video detection speeds of the video sensor of the prior art LKAS.

Referring to FIG. 2, a problem arises in that the system cannot follow the traveling characteristics of a vehicle in real time due to the repeated use of data that is measured by the video sensor. Accordingly, the vehicle controlled by the system cannot be accurately kept in its lane and has a certain error value.

FIG. 3 shows that an error in the deviation distance (e.g., approximately 10 cm) may occur when the data processing period of a video sensor is 50 ms and the data processing period of a system is 10 ms.

The above information disclosed in this Background section is only for enhancement of understanding of the background of the invention and therefore it may contain information that does not form the prior art that is already known in this country to a person of ordinary skill in the art.

SUMMARY

Accordingly, the present invention has been made keeping in mind the above problems occurring in the prior art, and an object of the present invention is to provide an LKAS that is equipped with a compensator capable of estimating a deviation angle $\theta_p$ of a vehicle and a deviation distance $y_p$ based on the kinematic characteristics of vehicle.

In order to accomplish the above object, the present invention, in one aspect, provides an LKAS including a video sensor unit, a sensor unit, a control unit, and a compensation unit. The video sensor unit captures video image or images outside of a vehicle and measuring location information of the vehicle and a curvature $\rho_p$ of a lane. The (variable) sensor unit measures a variable value or values related to one or more kinematic characteristics of the vehicle. The control unit performs lane keeping control based on the location information of the vehicle, the curvature of the lane and the variable value or values related to the kinematic characteristics. The compensation unit estimates a deviation angle $\theta_p$ and a deviation distance $y_p$ based on data from the video sensor unit, the sensor unit and the control unit in a period that is a control data processing period of the control unit but is not a measurement period of the video sensor unit, and transmits the estimated values to the control unit.

In this case, the location information of the vehicle measured by the video sensor unit may be a deviation angle $\theta_p$ and a deviation distance $y_p$ of the vehicle with respect to a measuring point.

The variable value or values related to the kinematic characteristics may be a velocity V of the vehicle, a yaw rate $\gamma$ and a required forward angle $\delta_f$ measured by the sensor unit 20, or a combination thereof.

Furthermore, the data transmitted from the video sensor unit, the sensor unit and the control unit 40 to the compensation unit may include at lease one of a deviation angle $\theta_p$ and a deviation distance $y_p$ measured by the video sensor unit 10, a velocity V and a yaw rate $\gamma$ measured by the sensor unit, and a lateral velocity v estimated by the control unit. In detail, the deviation distance estimated by the compensation unit may be $y_p = \int (v + L_p \times \gamma + V \times \theta_p) dt$ (where $L_p$ is a distance between a measuring point of the video sensor and a central axis of the vehicle), and the estimated deviation angle $\theta_p$ by the compensation unit may be $\theta_p = \int (\gamma - V \times \rho) dt$, where $\rho$ is a curvature of a road.

In this case, the control unit may calculate a torque value $T_m$ of a steering motor of the vehicle using the following state equation, and perform control function so that the vehicle remains in a target lane:

$$\begin{bmatrix} \ddot{\delta}_f \\ \dot{\delta}_f \\ \dot{\gamma} \\ \dot{v} \\ \dot{\theta}_p \\ \dot{y}_p \end{bmatrix} = \begin{bmatrix} -\dfrac{C_s}{I_s} & -\dfrac{\xi C_t}{I_s} & \dfrac{\xi C_f L_f}{I_s V} & \dfrac{\xi C_f}{I_s V} & 0 & 0 \\ 1 & 0 & 0 & 0 & 0 & 0 \\ 0 & \dfrac{C_f l_f}{I_s} & -\dfrac{C_f L_f^2 + C_r L_r^2}{I_s V} & -\dfrac{C_f L_f - C_r L_r}{I_s V} & 0 & 0 \\ 0 & \dfrac{C_f}{m} & -V - \dfrac{C_f L_f - C_r L_r}{mV} & -\dfrac{C_f + C_r}{mV} & 0 & 0 \\ 0 & 0 & 1 & 0 & 0 & 0 \\ 0 & 0 & L_p & 1 & V & 0 \end{bmatrix} \begin{bmatrix} \dot{\delta}_f \\ \delta_f \\ \gamma \\ v \\ \theta_p \\ y_p \end{bmatrix} + \begin{bmatrix} \dfrac{N_m}{I_s} \\ 0 \\ 0 \\ 0 \\ 0 \\ 0 \end{bmatrix} T_m + \begin{bmatrix} \dfrac{N_s}{I_s} & 0 \\ 0 & 0 \\ 0 & 0 \\ 0 & 0 \\ 0 & -V \\ 0 & 0 \end{bmatrix} \begin{bmatrix} T_h \\ \rho_p \end{bmatrix}$$

$$y = Cx = \begin{bmatrix} \theta_p \\ y_p \end{bmatrix} = \begin{bmatrix} 0 & 0 & 0 & 0 & 1 & 0 \\ 0 & 0 & 0 & 0 & 0 & 1 \end{bmatrix} x$$

where $C_s$ represents a damping value of the steering system of the vehicle, $I_s$ represents an inertia moment of the steering system, $\xi$ represents a contact distance of wheels, $C_f$ represents a cornering stiffness value of the front wheels of the vehicle, $L_f$ represents a distance from the center of gravity of the vehicle to the front wheel axis, $C_r$ represents a cornering stiffness value of the rear wheels of the vehicle, $L_r$ represents a distance from the center of gravity of the vehicle to the rear wheel axis, m represents the weight of the vehicle, $N_m$ represents a gear ratio of the motor of the vehicle, $N_s$ represents a steering ratio of an actual steering device, $T_h$ represents a torque of a steering wheel of the vehicle, and $\rho_p$ represents a curvature of a lane.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
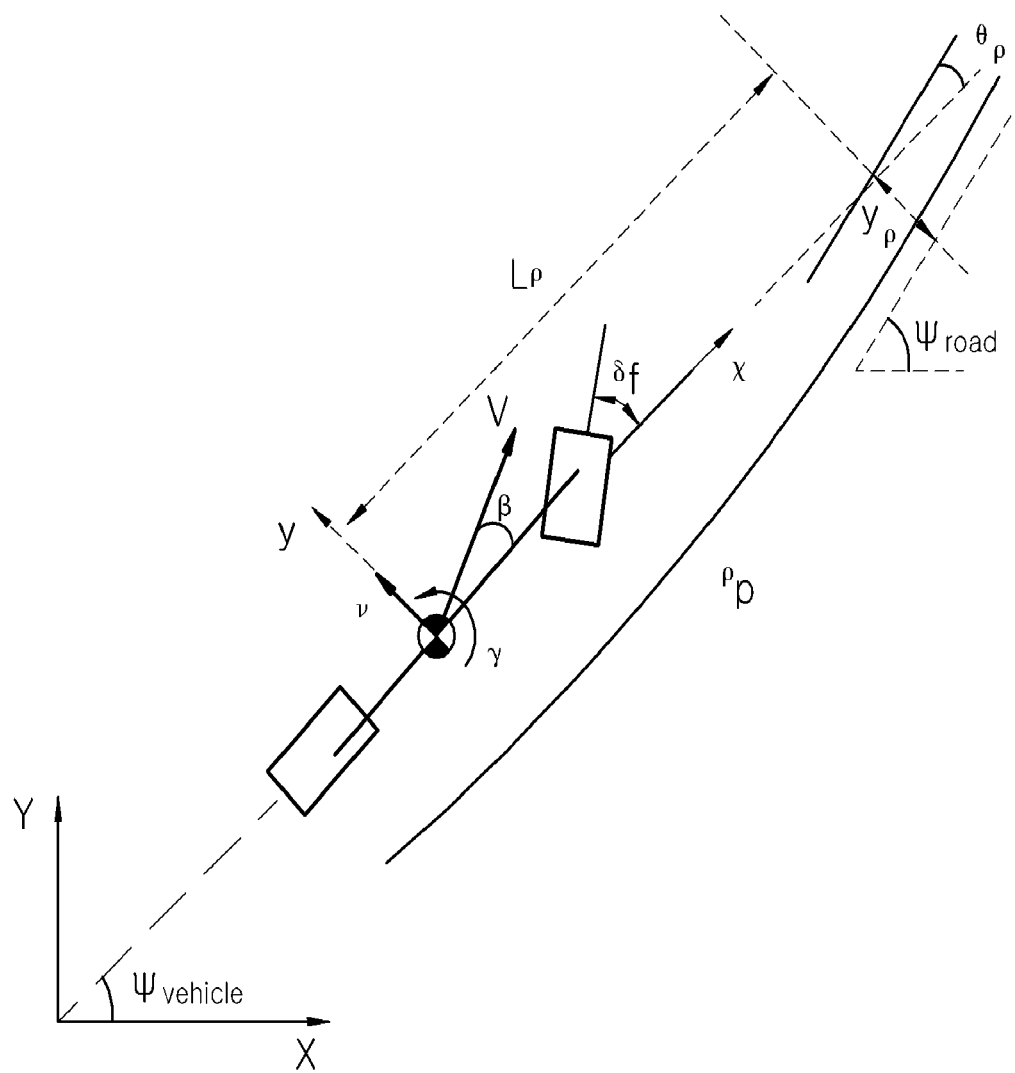
FIG. 1 is a diagram showing variables indicative of the kinematic characteristics of a vehicle.
Figure 2:
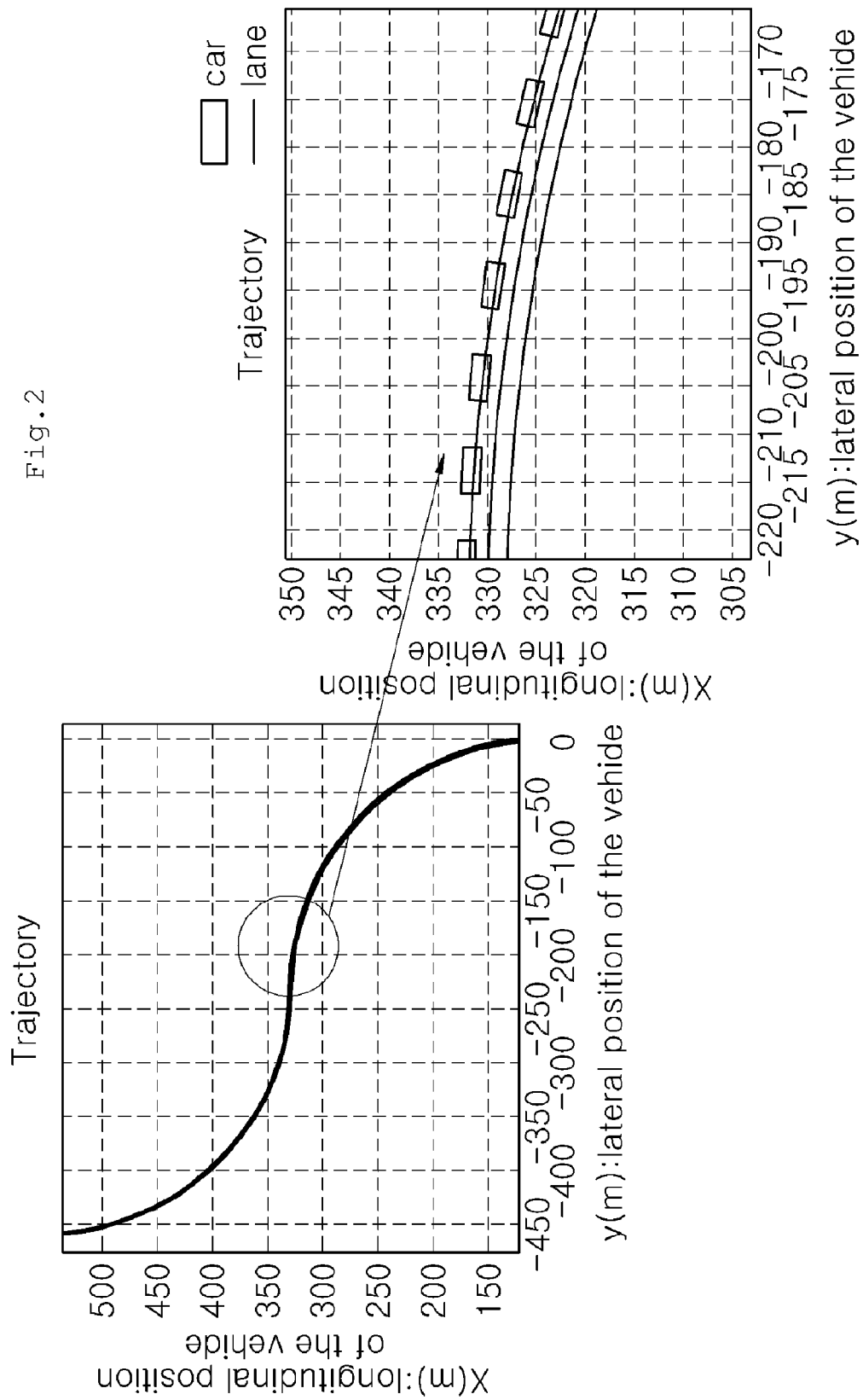
FIG. 2 is a graph illustrating the lane following performance of the prior art LKAS.
Figure 3:
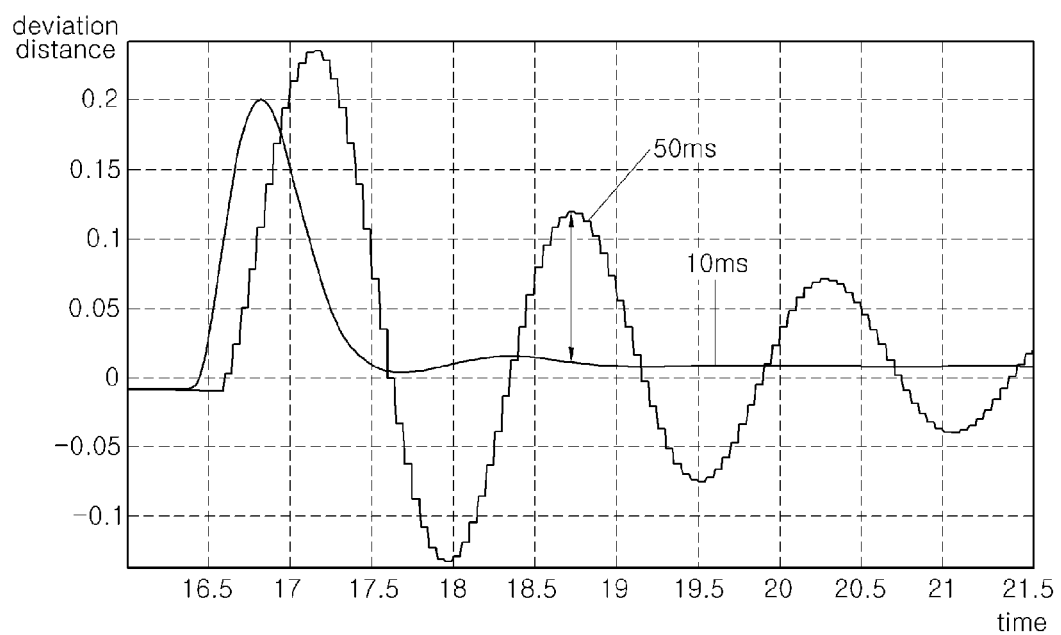
FIG. 3 is a graph illustrating the lane following performance based on video detection speeds of the video sensor of the prior art LKAS.

Hereinafter reference will now be made in detail to various embodiments of the present invention, examples of which are illustrated in the accompanying drawings and described below, in which the same reference numerals are used to designate the same or similar components.

Figure 4:
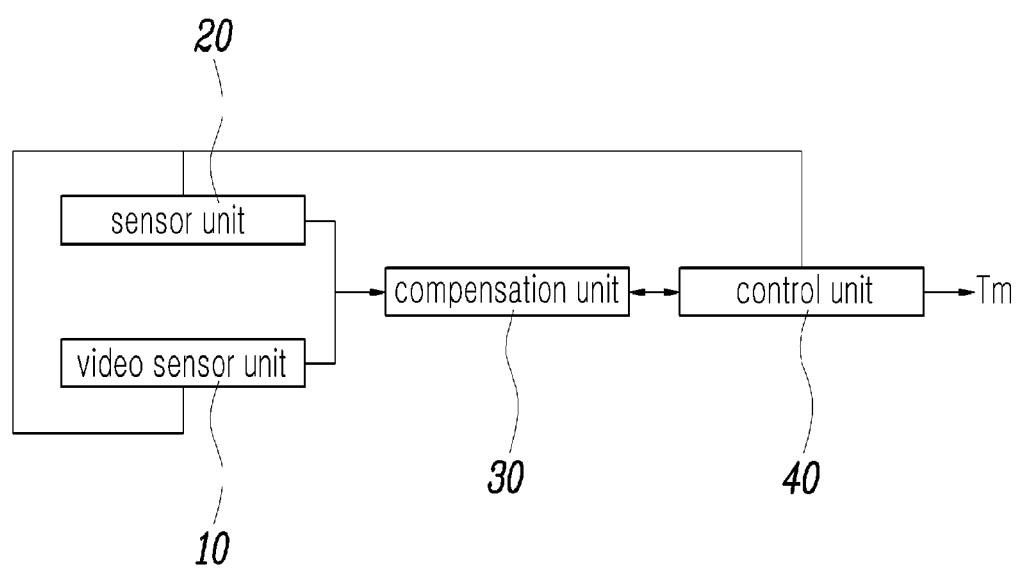
FIG. 4 is a conceptual diagram of an LKAS according to the present invention.

FIG. 4 is a conceptual diagram showing an LKAS according to the present invention. Referring to FIG. 4, the LKAS according to the present invention includes a video sensor unit 10, a sensor unit 20, a compensation unit 30, and a control unit 40.

The video sensor unit 10 captures video image or images outside of a vehicle, and creates video image information. In greater detail, the video sensor unit 10 measures a deviation angle $\theta_p$ at a measuring point, a deviation distance $y_p$ and a lane curvature $\rho_p$ through the captured video image information (see FIG. 1).

In this case, since the data processing speed of the video sensor unit 10 is lower than the data processing speed of the control unit 40 as described above, it is necessary to appropriately compensate for the deviation angle $\theta_p$ and the deviation distance $y_p$.

The sensor unit 20 measures a kinematic characteristic variable or variables of the vehicle necessary for lane-keeping control. In greater detail, the sensor unit 20 measures a velocity V of the vehicle, a yaw rate $\gamma$ and a required forward angle $\delta_f$. Here, the data processing speed of the sensor unit 20 is the same as that of the control unit 40.

The compensation unit 30 estimates the deviation angle $\theta_p$ and the deviation distance $y_p$ in conformity with the processing speed of the control unit 40 based on the data measured by the video sensor unit 10 and the sensor unit 20 to be synchronized with the data processing speed of the control unit 40. That is, the compensation unit 30 estimates the deviation angle and the deviation distance during periods corresponding to the difference between the data processing speed of the video sensor 10 and the data processing speed of the control unit 40.

For clarity, the deviation angle and the deviation distance measured by the video sensor 10 are respectively referred to as the 'measured deviation angle' and the 'measured deviation distance.' Meanwhile, the deviation angle and the deviation distance estimated by the compensation unit 30 are respectively referred to as the 'estimated deviation angle' and the 'estimated deviation distance.'

The estimated deviation distance and the estimated deviation angle and can be obtained by the following Equations 1 and 2, respectively.

$$y_p = \int (v + L_p \times \gamma + V \times \theta_p) dt \quad (1)$$

$$\theta_p = \int (\gamma - V \times \rho) dt \quad (2)$$

That is, according to Equation 1, the estimated deviation distance is the sum of the deviation distance $y_p = \int v dt$ estimated based on the lateral velocity v of a vehicle, the deviation distance $y_p = \int (L_p \times \gamma) dt$ estimated based on the yaw rate $\gamma$ of the vehicle, and the deviation distance $y_p = \int (V \times \theta_p) dt$ estimated base on the distortion of the vehicle.

Here, $L_p$ is a distance between the measuring point of the video sensor 10 and the central axis of the vehicle, which is a constant.

Furthermore, the deviation angle in the equation with regard to the deviation distance estimated based on the distortion of the vehicle is a measured deviation angle measured by the video sensor 10.

According to Equation 2, the estimated deviation angle is the sum of the deviation angle $\theta_p = \int \gamma dt$ estimated based on the yaw rate and the deviation angle $\theta_p = \int (-V \times \rho) dt$ estimated based on a road curvature $\rho$.

Here, the road curvature represents a curvature measured by the video sensor 10.

The control unit 40 performs lane-keeping control based on the kinematic characteristics of the vehicle measured by the video sensor unit 10 and the sensor unit 20 and the estimated deviation angle and the estimated deviation distance compensated for by the compensation unit 30. The control unit 40 involves a control state equation shown in the following Equation 3.

$$\begin{bmatrix} \ddot{\delta}_f \\ \dot{\delta}_f \\ \dot{\gamma} \\ \dot{v} \\ \dot{\theta}_p \\ \dot{y}_p \end{bmatrix} = \begin{bmatrix} -\frac{C_s}{I_s} & -\frac{\xi C_t}{I_s} & \frac{\xi C_f L_f}{I_s V} & \frac{\xi C_f}{I_s V} & 0 & 0 \\ 1 & 0 & 0 & 0 & 0 & 0 \\ 0 & \frac{C_f l_f}{I_s} & -\frac{C_f L_f^2 + C_r L_r^2}{I_s V} & -\frac{C_f L_f - C_r L_r}{I_s V} & 0 & 0 \\ 0 & \frac{C_f}{m} & -V - \frac{C_f L_f - C_r L_r}{mV} & -\frac{C_f + C_r}{mV} & 0 & 0 \\ 0 & 0 & 1 & 0 & 0 & 0 \\ 0 & 0 & L_p & 1 & V & 0 \end{bmatrix} \begin{bmatrix} \dot{\delta}_f \\ \delta_f \\ \gamma \\ v \\ \theta_p \\ y_p \end{bmatrix} + \begin{bmatrix} \frac{N_m}{I_s} \\ 0 \\ 0 \\ 0 \\ 0 \\ 0 \end{bmatrix} T_m + \begin{bmatrix} \frac{N_s}{I_s} & 0 \\ 0 & 0 \\ 0 & 0 \\ 0 & 0 \\ 0 & -V \\ 0 & 0 \end{bmatrix} \begin{bmatrix} T_h \\ \rho_p \end{bmatrix} \quad (3)$$

$$y = Cx = \begin{bmatrix} \theta_p \\ y_p \end{bmatrix} = \begin{bmatrix} 0 & 0 & 0 & 0 & 1 & 0 \\ 0 & 0 & 0 & 0 & 0 & 1 \end{bmatrix} x$$

where $C_s$ represents a damping value of the steering system of the vehicle, $I_s$ represents an inertia moment of the steering system, $\xi$ represents a contact distance of wheels, $C_f$ represents a cornering stiffness value of the front wheels of the vehicle, $L_f$ represents a distance from the center of gravity of the vehicle to the front wheel axis, $C_r$ represents a cornering stiffness value of the rear wheels of the vehicle, $L_r$ represents a distance from the center of gravity of the vehicle to the rear wheel axis, m represents the weight of the vehicle, $N_m$ represents a gear ratio of the motor of the vehicle, $N_s$ represents a steering ratio of an actual steering device, $T_h$ represents a torque of a steering wheel of the vehicle, and $\rho_p$ represents a curvature of a lane.

The velocity V of the vehicle and the torque $T_h$ of the steering wheel are measured by the sensor unit 20. The lane curvature $\rho_p$ is estimated by the observation device included in the control unit 40. The remaining values are constants that are predetermined depending on the type of vehicle.

From Equation 3, the control unit 40 calculates a torque value of the steering motor of the vehicle. More particularly, the control unit 40 calculates a torque value $T_m$ of the steering motor, which makes the values of the deviation angle and the deviation distance, among the values of the state variables of Equation 3, become zero.

Here, it is impossible to measure the lateral velocity of the vehicle, and the lateral velocity is estimated through an observation device included in the control unit 40.

Furthermore, the deviation angle $\theta_p$ and the deviation distance $y_p$ are the measured deviation angle and the measured deviation distance measured by the video sensor unit 10, or the estimated deviation angle and the estimated deviation distance measured by the compensation unit 30.

Preferably, the control unit 40 performs lane-keeping control using the deviation angle and the deviation distance measured by the video sensor unit 10 in case where its period is the same as that of the video sensor unit 10 (for example, 50 ms, 100 ms, 150 ms, . . . ), and performs lane-keeping control using the deviation angle and the deviation distance estimated by the compensation unit 30 in case where it is not the same as the period of the video sensor unit 10 (for example, 10 ms, 20 ms, 30 ms, 40 ms, 60 ms, . . . ).

Figure 5:
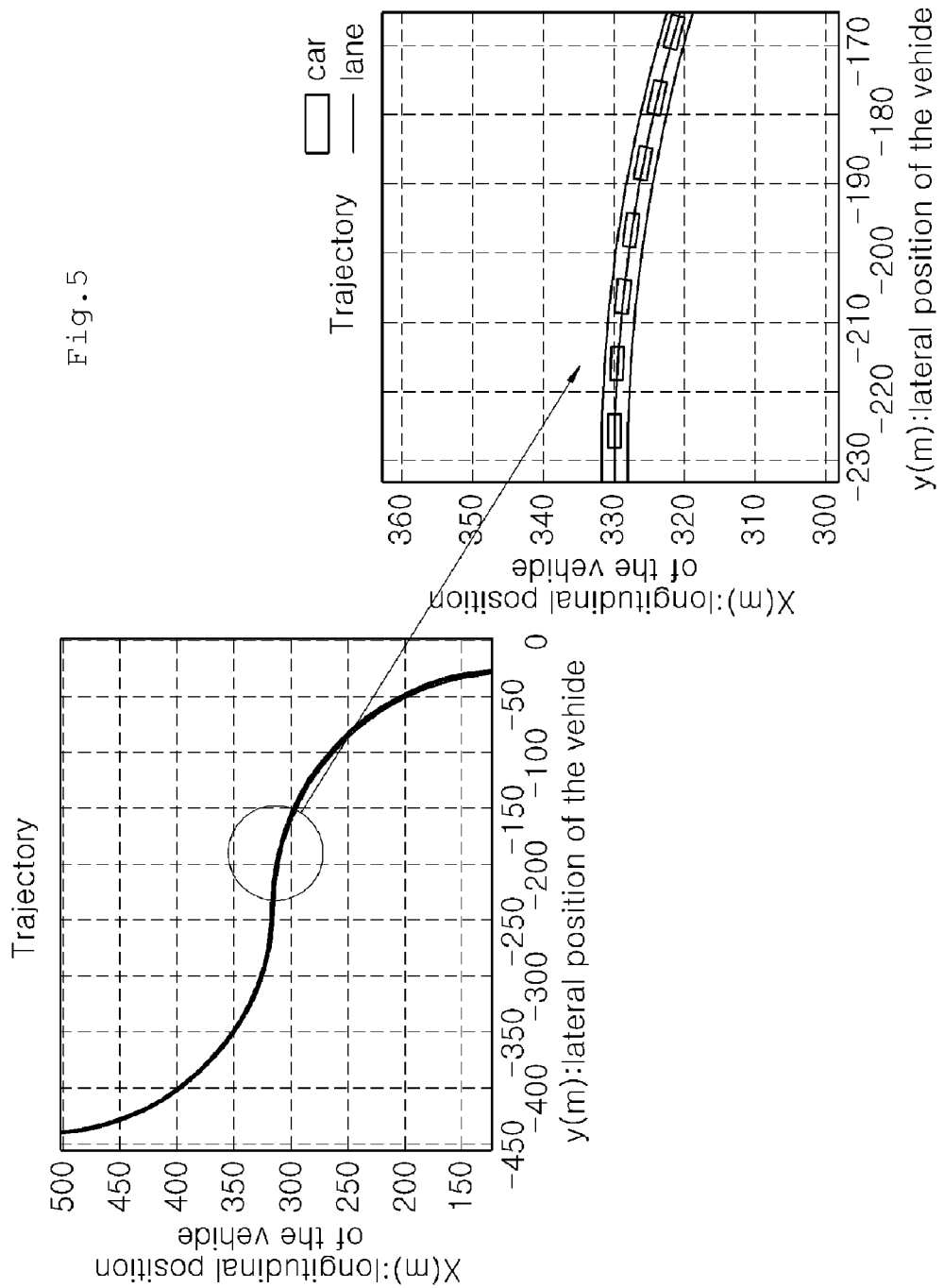
FIG. 5 is a graph showing the lane following performance of an LKAS according to an embodiment of the present invention.

FIG. 5 is a graph showing the lane following performance of the LKAS according to the present invention. From FIG. 5, it can be seen that lane keeping control performance is improved in the case in which the deviation angles and deviation distances, measured by the video sensor unit 10 of the vehicle, and the deviation angles and deviation distances, estimated by the compensation unit 30, are used.

Figure 6:
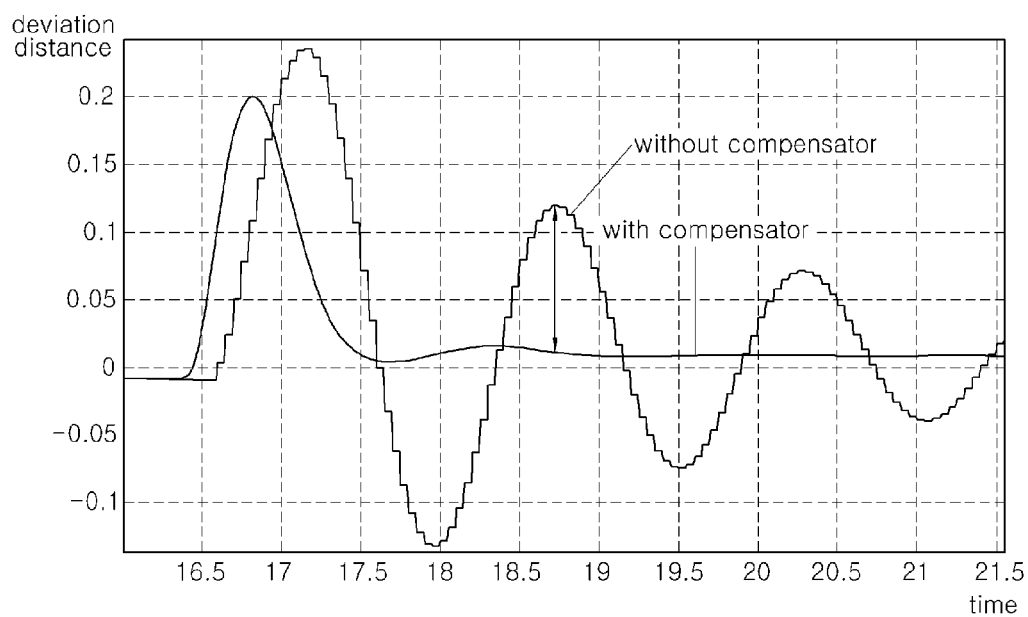
FIG. 6 is a graph comparing the lane following performance of the LKAS equipped with a compensator according to the present invention with that of the prior art LKAS.

FIG. 6 is a graph comparing the lane following performance of the LKAS equipped with a compensator according to the present invention with that of the prior art LKAS. From FIG. 6, it can be seen that in the LKAS according to the present invention, the deviation distance error is reduced by about 10 cm in spite of the fact that the processing period of the video sensor unit 10 is 50 ms.

As described above, the lane keeping control performance can be significantly improved by estimating the deviation angles and the deviation distances, which cannot be obtained by the video sensor, using another kinematic characteristic equation.

According to the present invention, data measured by a video sensor having a inexpensive low data processing speed can be compensated for so as to keep a vehicle in a target lane, with the result that the safety and comfort can be improved and manufacturing costs can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lane-keeping assist system (LKAS) for a vehicle, comprising:
    a video sensor unit for capturing video image or images outside of the vehicle and measuring location information of the vehicle and a curvature ($\rho_p$) of a lane with respect to a measuring point;
    a sensor unit for measuring a variable value or values related to one or more kinematic characteristics of the vehicle;
    a control unit for performing lane keeping control based on the location information, the lane curvature and the variable value or values related to the kinematic characteristics; and
    a compensation unit for estimating a deviation angle ($\theta_p$) and a deviation distance ($y_p$) based on data from the video sensor unit, the sensor unit and the control unit in a period that is a control data processing period of the control unit but is not a measurement period of the video sensor unit, and transmitting the estimated values to the control unit.

2. The LKAS as set forth in claim 1, wherein the location information of the vehicle measured by the video sensor unit is a deviation angle ($\theta_p$) and a deviation distance ($y_p$) of the vehicle with respect to the measuring point.

3. The LKAS as set forth in claim 1, wherein the variable value related to the kinematic characteristics is a velocity (V) of the vehicle, a yaw rate ($\gamma$), a required forward angle ($\delta_f$) measured by the sensor unit 20, or a combination thereof.

4. The LKAS as set forth in claim 1, wherein the data transmitted from the video sensor unit, the sensor unit and the control unit 40 to the compensation unit comprises at least one selected from the group consisting of a deviation angle ($\theta_p$) and a deviation distance ($y_p$) measured by the video sensor unit 10, a velocity (V) of the vehicle and a yaw rate ($\gamma$) measured by the sensor unit, and a lateral velocity (v) estimated by the control unit.

5. The LKAS as set forth in claim 1, wherein the deviation distance estimated by the compensation unit is obtained by the equation $y_p = \int(v + L_p \times \gamma + V \times \theta_p)dt$ where v is a lateral velocity, $L_p$ is a distance between a measuring point of the video sensor and a central axis of the vehicle, $\gamma$ is a yaw rate of the vehicle, V is a velocity of the vehicle and the estimated deviation angle by the compensation unit is obtained by the equation $\theta_p = \int(\gamma - V \times \rho)dt$ where $\rho$ is a curvature of a road.

6. The LKAS as set forth in any one of claims 1, wherein the control unit calculates a torque value $T_m$ of a steering motor of the vehicle using the following state equation and performs control so that the vehicle is kept in a target lane:

$$\begin{bmatrix} \ddot{\delta}_f \\ \dot{\delta}_f \\ \dot{\gamma} \\ \dot{v} \\ \dot{\theta}_p \\ \dot{y}_p \end{bmatrix} = \begin{bmatrix} -\frac{C_s}{I_s} & -\frac{\xi C_t}{I_s} & \frac{\xi C_f L_f}{I_s V} & \frac{\xi C_f}{I_s V} & 0 & 0 \\ 1 & 0 & 0 & 0 & 0 & 0 \\ 0 & \frac{C_f l_f}{I_s} & -\frac{C_f L_f^2 + C_r L_r^2}{I_s V} & -\frac{C_f L_f - C_r L_r}{I_s V} & 0 & 0 \\ 0 & \frac{C_f}{m} & -V - \frac{C_f L_f - C_r L_r}{mV} & -\frac{C_f + C_r}{mV} & 0 & 0 \\ 0 & 0 & 1 & 0 & 0 & 0 \\ 0 & 0 & L_p & 1 & V & 0 \end{bmatrix} \begin{bmatrix} \dot{\delta}_f \\ \delta_f \\ \gamma \\ v \\ \theta_p \\ y_p \end{bmatrix} + \begin{bmatrix} \frac{N_m}{I_s} \\ 0 \\ 0 \\ 0 \\ 0 \\ 0 \end{bmatrix} T_m + \begin{bmatrix} \frac{N_s}{I_s} & 0 \\ 0 & 0 \\ 0 & 0 \\ 0 & 0 \\ 0 & -V \\ 0 & 0 \end{bmatrix} \begin{bmatrix} T_h \\ \rho_p \end{bmatrix}$$

$$y = Cx = \begin{bmatrix} \theta_p \\ y_p \end{bmatrix} = \begin{bmatrix} 0 & 0 & 0 & 0 & 1 & 0 \\ 0 & 0 & 0 & 0 & 0 & 1 \end{bmatrix} x$$

where $C_s$ represents a damping value of the steering system of the vehicle, $I_s$ represents an inertia moment of the steering system, $\xi$ represents a contact distance of wheels, $C_f$ represents a cornering stiffness value of the front wheels of the vehicle, $L_f$ represents a distance from the center of gravity of the vehicle to the front wheel axis, $C_r$ represents a cornering stiffness value of the rear wheels of the vehicle, $L_r$ represents a distance from the center of gravity of the vehicle to the rear wheel axis, m represents the weight of the vehicle, $N_m$ represents a gear ratio of the motor of the vehicle, $N_s$ represents a steering ratio of an actual steering device, $T_h$ represents a torque of a steering wheel of the vehicle, and $\rho_p$ represents a curvature of a lane.

\* \* \* \* \*